United States Patent
Braunhut

[15] 3,687,110
[45] Aug. 29, 1972

[54] INSECT ACTIVITY OBSERVATION CENTER

[72] Inventor: Harold N. Braunhut, c/o Honey Toy Industries, 200 5th Ave., New York, N.Y. 10010

[22] Filed: Sept. 3, 1970

[21] Appl. No.: 69,229

[52] U.S. Cl. ................................. 119/1, 119/15
[51] Int. Cl. .................................... A01k 01/00
[58] Field of Search ................. 119/1, 15; 35/20

[56] References Cited

UNITED STATES PATENTS

| | | | |
|---|---|---|---|
| 2,174,305 | 9/1939 | Austin | 119/1 |
| 925,209 | 6/1909 | Livermore | 35/20 |
| 2,151,589 | 3/1939 | Falls | 119/1 |
| 3,367,308 | 2/1968 | Quattrone et al. | 119/15 |

Primary Examiner—Hugh R. Chamblee
Attorney—Friedman & Goodman

[57] ABSTRACT

A device for the observation of the individual, group and intergroup activities of colony forming insects, such as ants, comprised of two or more removable and exchangeable elements for receiving and cultivating the insects or colonies, and an intergroup activity observation chamber. The cultivation elements are provided with elements to permit the introduction, or removal, of insects or other materials, and may be provided with a nesting element. The receiving and cultivating elements are also provided with a plurality of magnifiers and with an egress leading to the intergroup activity chamber, wherein these elements may be provided with transparent walls which are preferably colored red to view the insects within the nesting element. The chamber is provided with an element to control the passage of insects from, or back to, the cultivating elements. This chamber is also provided with an additional access element to permit the introduction into or removal from the chamber of insects or materials as described, and with a magnifying element for better observation.

14 Claims, 8 Drawing Figures

PATENTED AUG 29 1972 3,687,110

HAROLD N. BRAUNHUT
INVENTOR

Friedman & Goodman
ATTORNEYS

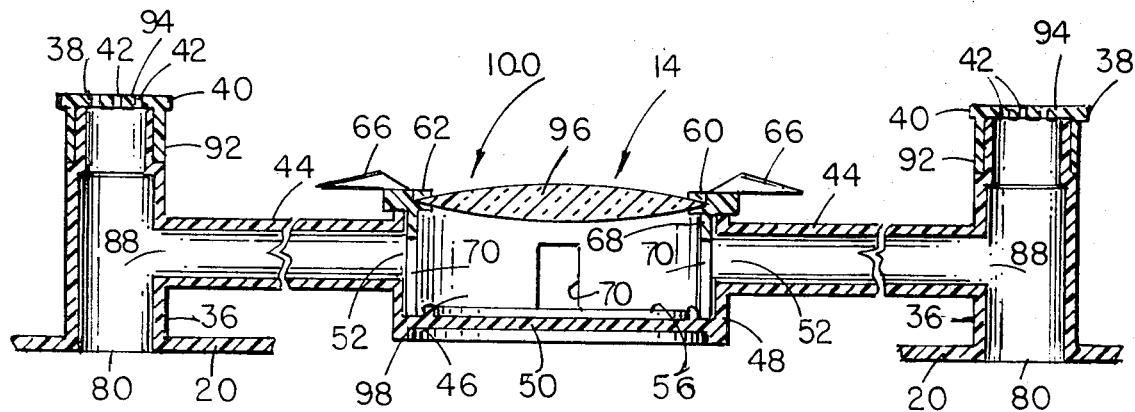
FIG. 3.
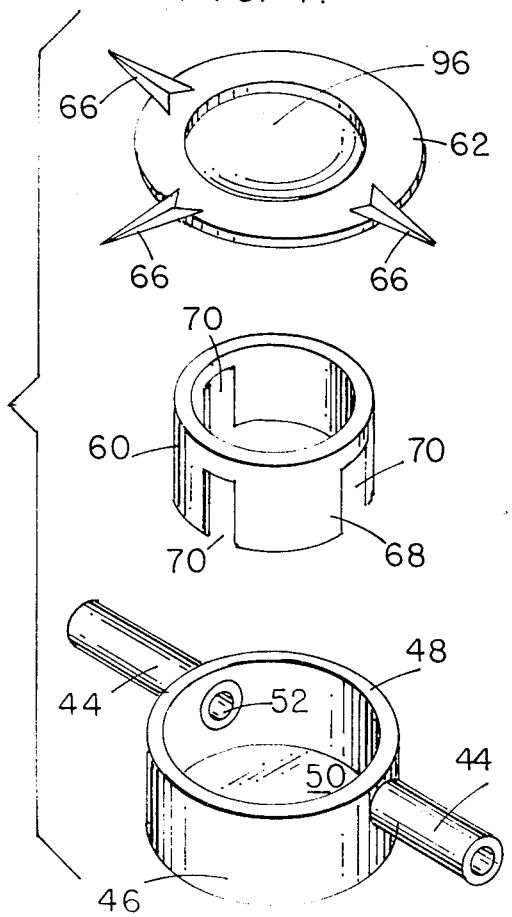
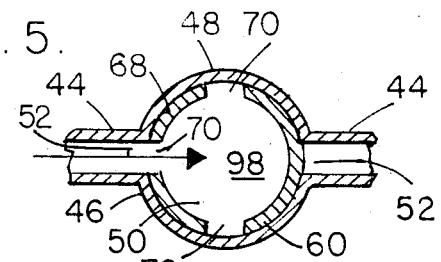
FIG. 5.
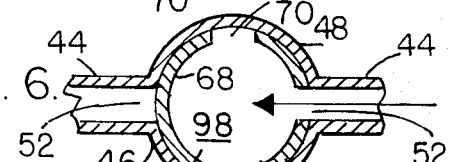
FIG. 6.
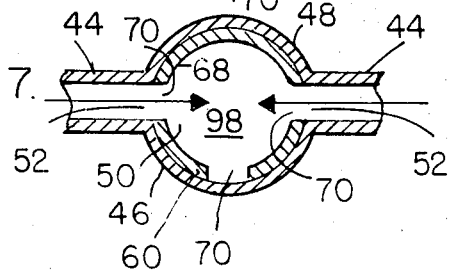
FIG. 7.
HAROLD N. BRAUNHUT
INVENTOR
ATTORNEY

INSECT ACTIVITY OBSERVATION CENTER

BACKGROUND OF THE INVENTION

Structures for the observation and cultivation of an insect colony is well known in the art. Such structures permit the observation of the activities of the colony forming insects, such as ants, whereby the viewer may interpret the insect activities in terms of human conduct. However, these known structures only permit the observation of one colony with respect to itself, wherein the colony of one structure is always separated from the colony of another structure. The present invention provides a structure whereby a plurality of colonies may be simultaneously observed, either separated from one another or where selected members of one colony mingle with selected members of another colony of the structure.

SUMMARY OF THE INVENTION

This invention relates to a device for observation, and more particularly to a device for the observation and cultivation of insect colonies, and for the observation of the activities of colony forming insects, such as ants. The insect observation center is constructed preferably of transparent plastic material and includes two or more removable and exchangeable receptacles provided with nesting means for receiving and cultivating insect colonies and a chamber for the observation of the interaction of members of different colonies. The receptacles may have transparent walls which are colored red to view the insects within the nesting means. The cultivating receptacles are provided with means for introducing or removing materials and the center is also provided with elements to permit or block the passage of insects from any one or both of the receptacles to the chamber. The center is also provided with means to indicate which passage, or passages, is open or closed.

Accordingly, an object of the present invention is to provide an observation device which overcomes the disadvantages of the prior art.

Another object of this invention is to furnish a center for the observation and cultivation of insect colonies, and for the observation of the activities of colony forming insects such as ants.

A further object of this invention is to provide a center including means whereby a plurality of colonies may be simultaneously observed while the members are engaged in their normal activities, wherein it provides for keeping the members of each colony separated from the members of other colonies and prevents their intermingling, while providing for nesting means for each colony.

A still further object of this invention is to provide a center including means to aid the viewer or student to visualize and interpret the insect activities in terms of human conduct.

Yet another object of this invention is to provide a center including means for introducing various materials into and removing various materials from the environment of each colony and allows for the observation and study of the effects of such introduction or removal.

And yet another object of this invention is to furnish a center which provides for a chamber where members of different colonies will be permitted to interact, and provides means for permitting selected members of one colony to mingle with selected members of another colony so that their interactions may be observed and studies, wherein the center provides means for observation improved over observation with the naked eye.

And still yet another object of the present invention is to provide a device, with the aforesaid characteristics, suitable for use by the serious student of any age as well as for recreation and entertainment.

And still yet an additional object of the present invention is to provide a device which is simple and economical to manufacture and assemble, and is made of readily available materials.

BRIEF DESCRIPTION OF THE DRAWINGS

Having in mind the above and other objects evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings in which:

FIG. 3 is a sectional view of the present invention, taken along line 3—3 of FIG. 2;

FIG. 4 is an exploded perspective view of an intergroup activity observation chamber of the present invention;

FIGS. 5–7 are sectional views showing an inner cylinder of the intergroup activity observation chamber in three selected positions.

DESCRIPTION OF THE INVENTION

Figure 1:
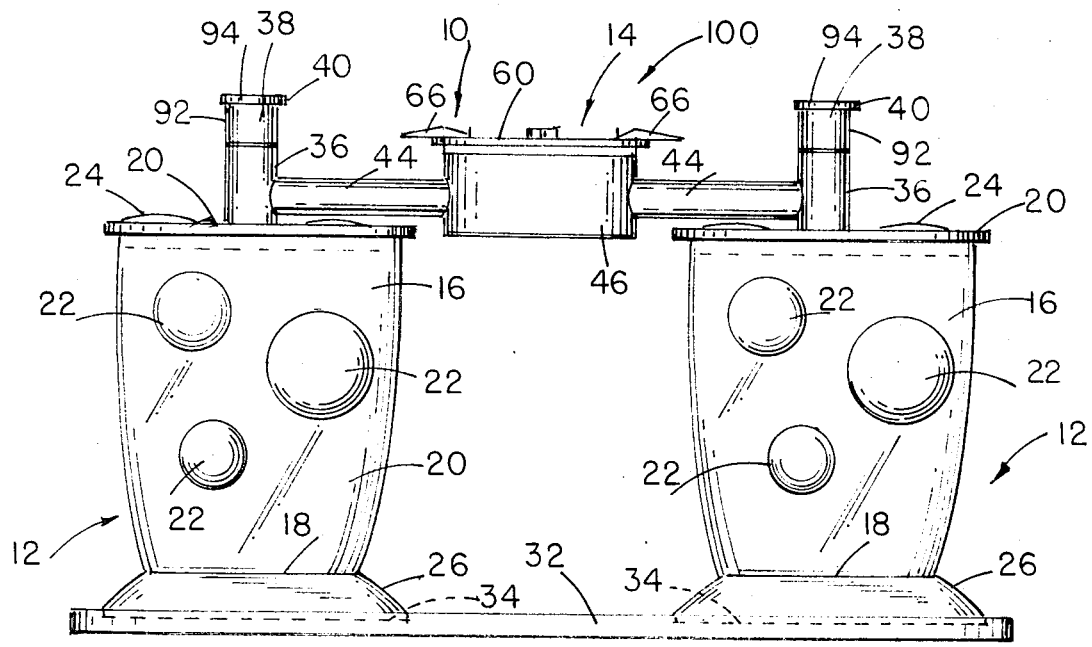
FIG. 1 is a front elevational view of an observation center pursuant to the present invention.
Figure 8:
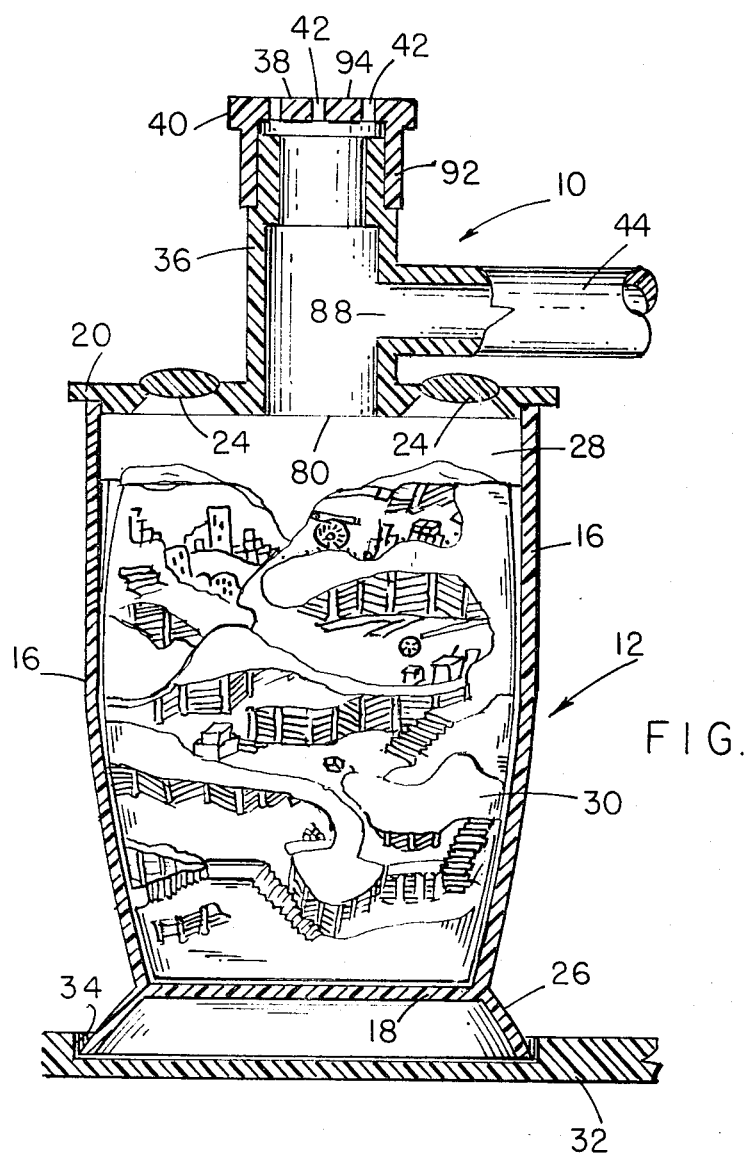
FIG. 8 is a fragmentary, front elevational view, in section, of one of the cultivation elements of the present invention.

As appears from FIG. 1, a center 10 is provided with two receiving and cultivation elements or units 12 and an intergroup activity observation chamber 14. The receiving and cultivation elements 12 are preferably vaselike in shape, each is provided with vertical walls 16 and a bottom wall 18, with the units 12 resting upon a common base 32. For better stability, the units 12 may each be provided with a flared bottom section 26 which fits into depressions or recesses 34 in the common base 32. The receiving and cultivating units 12 are preferably of transparent plastic material such as polystyrene, and may be molded in one piece with the flared bottom portion 26 which may be of a different color, if so desired. The vertical walls 16 and bottom wall 18 define the interior nesting space 28 into which may be fitted a nest or simulated ant hill 30. The nest 30 may have various forms, and furnishes the base for the insect action to be observed, as shown in FIG. 8.

For increased attraction and the stimulation of interest, artificial nesting means 30 may be provided with a construction which is based upon the observation of the nesting construction of insects, such as ants, which normally tunnel in sand or under stones in order to build nests. The artificial nest 30 may be given sculpturing and background to simulate human habitation in miniature, wherein stairways may be utilized instead of ramps and passageways, with rooms instead of nest holes; the rooms being furnished with miniature furniture to a scale suitable for the insect. Nesting means 30 may also be provided with backgrounds such as stage settings. These stimulate the viewer to visualize the insects as having humanlike attributes and qualities and thus increase the viewer's enjoyment.

The nesting means 30 is preferably constructed of an opaque material having portions thereof substantially flush against the vertical walls 16 so that the insects are forced to use the stairways, ramps and passageways provided therefor. It has been observed that some insects do not perceive a red color. Therefore, the transparent vertical walls 16 of each unit 12 may be colored red so that the insects will be unaware of any observation while the insects are in the nesting means 30. The artificial habitat may be prefabricated, molded, or cast, thus obviating the need for tunneling sand or other similar materials.

The vertical walls 16 of each unit 12 are provided with a plurality of magnifying sections 22, in the form of convex lens shaped structures which may be molded or cast integrally with the unit 12 if the unit 12 is of transparent plastic material, or may be separate convex lenses inserted into, cemented or otherwise attached to the vertical walls 16 of each unit 12.

Each receiving and cultivating unit 12 is provided with a removable top cover 20 shaped and dimensioned to fit upon and cover the top of the receiving and cultivating unit 12. Top cover 20 is preferably of a material similar to the material of which unit 12 is constructed. Top cover 20 is provided with a plurality of magnifiers 24 of the kind and similar to the magnifiers 22 in the vertical walls 16 of each unit 12.

Preferably, centrally located in each top cover 20, an exit opening 80 is provided, as shown in FIG. 3. Extending from the perimeter of opening 80, and in communicating relation with opening 80 and substantially perpendicular to top cover 20, exit passageway member 36 is provided, the passageway member 36 being open at the top and provided with a cap 38. Cap 38 is similar in shape to passageway member 36 and is provided with a closed end wall 94 and vertical walls 92. The inner shape of the vertical walls 92 is substantially equal to the outer shape of passageway member 36 so that the cap 38 fits around exit passageway member 36 with the end wall 94 of the cap 38 acting as a cover for the top of the exit passageway member 36. End wall 94 of the cap 38 may be provided with a plurality of perforations 42 for ventilating purposes. End wall 94 of the cap 38 may also be provided with a knurled rim or flange extension 40 for easier handling thereof.

Exit passageway member 36 is provided with an opening 88 in its vertical wall. Extending from the perimeter of opening 88 and substantially perpendicular to exit passageway member 36 and therefore, being substantially parallel to top cover 20, a side connecting passageway member 44 is provided for each unit 12. Side connecting passageway member 44 is in communicating relation with exit passageway member 36 and with space 28 in each associated unit 12. The passageway member 44 of each unit 12 is associated with the intergroup activity observation chamber 14, as set forth hereinbelow.

As shown in FIG. 4, the intergroup activity observation chamber 14 is comprised of an outer cylinder 46 and an inner cylinder 60. Outer cylinder 46 and inner cylinder 60 are removably telescopable, with inner cylinder 60 rotatable when telescoped inside outer cylinder 46, . Outer cylinder 46 includes an end wall 50 which closes off the bottom end, and a cylindrical sidewall 48. The other end of outer cylinder 46 is open. Cylindrical sidewall 48 of the outer cylinder 46 is provided with two diametrically opposed openings 52 each similar to and equal in dimensions to the dimensions of each opening 88 in the wall of each exit passageway member 36. Each connecting passageway member 44 extending from its respective exit passageway member 36 is of sufficient length to reach its associated opening 52 and is in communicating relationship with the opening 52.

Figure 2:
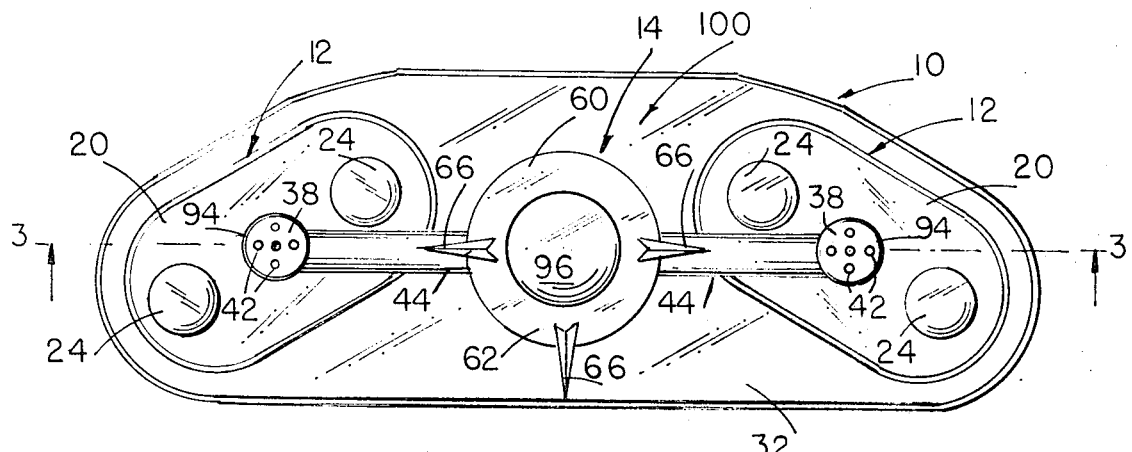
FIG. 2 is a top plan view of the present invention.

As appears in FIGS. 1 through 3, the two covers 20, each with its exit passageway member 36 and its connecting passageway member 44, each communicating with one of the diametrically opposed openings 52, and the outer cylinder 46 of the intergroup activity observation chamber 14 are preferably of unitary construction and preferably molded or cast in one piece. This, thus forms the cover assembly 100.

However, instead of the openning 88, each exit passageway member 36 may be provided with a three branched conduit or "T" fitting (not shown) having a lower, upper and a side branch. The lower branch is dimensioned to fit around the exit passageway member 36, the upper branch of the "T" fitting being dimensioned to receive the cap 38, and the side branch being dimensioned to accept a connecting side passageway member. In this embodiment, a coupling passageway member (not shown) is provided at each of the openings 52 of the outer cylinder 46 in communicating relationship with the openings 52, being dimensioned to mate with the connecting side passageway member associated with the side branch (not shown). If preferred, an elbow connector fitting may be used instead of a "T" connector fitting, obviating the necessity for an upper branch in the connector. Outer cylinder 46 may in this embodiment constitute a separate unit.

Inner cylinder 60 is provided with an upper end wall or cover member 62 closing off one end, and with a cylindrical sidewall 68 secured to the end wall 62 by conventional means. Inner cylinder sidewall 68 is provided with three slots 70, with two of the slots being located diametrically opposed to each other and the third slot being located approximately midway between the diametrically opposed slots. The slots thus divide the circumference of the sidewall 68 into three segments of approximately 180, 90 and 90 degrees, successively. The minimum width of each of slots 70 must be such as to permit the passage of the insects to the chamber 14 which is designed to observe or study, thereby corresponding to the openings 52.

The height of the sidewall 68 is substantially equal to the height of the sidewall 48 of the outer cylinder 46. Each of the slots 70 is of sufficient height to allow the passage of the insects from one side connecting passageway member 44, through the corresponding annular opening 52 of the outer cylinder 46 into the observation space 98 within the observation chamber 14.

End wall 50 of the outer cylinder 46 preferably is provided with an inner annular guide ring 56 in spaced relation with the side wall 48 of the outer cylinder 46, and at a distance from the sidewall 48 slightly greater than the thickness of the sidewall 68 of the inner cylinder 60. As hereinbefore described, the inner cylinder 60 is rotatable when telescoped inside the outer cylinder 46, the guide ring 56 serving as a guide and as a retaining ring with the sidewall 68 of the inner cylinder 60 fitting, and rotatable, between the sidewall 48 of the outer cylinder 46 and the annular ring 56. The height of the annular ring 56 is such as not to interfere with the passage of the insects into the observation chamber space 98 of the observation chamber 14, as hereinbefore described.

End wall 62 of the inner cylinder 60 is provided with an observation chamber magnifier 96. Magnifier 96 is a convex lens shaped structure which may be cast or molded integrally with the inner cylinder 60 or may be a separate convex lens inserted into an opening provided therefor in the end wall 62. End wall 62 may also be provided with a knurled rim for more convenient use. End wall 62 is also provided with indexing means 66 to indicate the position of the slots 70 in the sidewall 68. Such indexing means 66 may conveniently be in the form of arrowheads extending from the end wall 62.

As hereinbefore described, the openings 52 in the sidewall 48 of the outer cylinder 46 are diametrically opposed. Two of the slots 70 in the sidewall 68 of the inner cylinder 60 are also diametrically opposed. Inner cylinder 60 is rotatable to a position in which the diametrically opposed slots 70 uncover the diametrically opposed openings 52, as shown in FIG. 7, as indicated by two of the indices 66 being located over and pointing to connecting tubes 44, as shown in FIG. 2. If the inner cylinder 60 is now rotated approximately 90 degrees in one direction, as shown in FIG. 5, one of the openings 52 in the side wall 48 of the outer cylinder 46 will now be covered by the sidewall 68 of inner cylinder 60 while the other opening 52 in the sidewall 48 of the outer cylinder 46 will be uncovered by the third slot 70 in the sidewall 68 of inner cylinder 60. The uncovered opening 52 is again indicated by an index 66 pointing toward the opened one of the connecting tubes 44.

A rotation of 90 degrees in the reverse direction would have resulted in the location of the opened and covered openings 52 being exchanged, as shown in FIG. 6. When the rotation has moved the slots 70 sufficiently to pass the openings 52, both openings will be covered by the sidewall 68 of the inner cylinder 60. In order to indicate the width of the slots 70, the rear end of the arrowhead indices 66 may be the same width as the slots.

The intergroup activity observation chamber 14 and its connections as well as most of the other elements of the center 10 are preferably constructed of a transparent plastic material such as polystyrene, though those parts not involved in the direct observation of the activities may be of non-transparent materials if so desired.

The center 10 is assembled by telescoping the inner cylinder 60 into the outer cylinder 46 which, as hereinbefore described, is part of the cover assembly 100. A nest 30 may be placed into each of the receiving and cultivating units 12 and the units 12 placed on base 32. The cover assembly 100 is placed upon the units 12 and the device is ready for use.

Food and water may be introduced into the receiving and cultivating unit 12 either by lifting the cover 20 and then replacing the cover 20, or through the passageway member 36 by means of the cap 38. Proper humidity may be maintained by introducing a sponge into each receiving and cultivating unit 12 of the center 10, which is moistened from time to time. Preferably, the sponge is held in a bucket (not shown) suspended on the lower end of a fitted shaft (not shown) disposed in the passageway member 36 for each receiving and cultivating unit 12.

It has been observed that the colony forming insects, such as ants, shown organized forms of social activity. If it is desired to study such groups, members of the group are procured and introduced into one of the receiving and cultivating units 12 either by lifting the cover 20 and then replacing it, or through exit passageway member 36 and then closing it by means of the cap 38. If desired, ventilation perforations 42 may be closed off by means of a wad of cotton, or by a screen of suitably small mesh.

It has also been noted that members of a colony differ in their reactions to members of their own colonies when compared with their reactions to members of other colonies. For instance, ants show agressive forms of behavior in the presence of ants which are produced by queens other than their own.

Insects from different sources may be introduced into each of the two receiving and cultivating units 12, as hereinbefore described. By placing some attractive material such as food into the observation space 98 of the observation chamber 14, insects from each of the units 12 will be attracted to and will attempt to enter the observation chamber 14 and may be permitted to enter from either or both or neither of the units 12, by proper rotation of the inner cylinder 60, and their interaction or other behavior may be observed or studied. Thus, for instance, if the members of one colony fight the other, the stronger strain, if any, may be determined.

It is of course evident, that by slight modification in the construction more than two receiving and cultivating units 12 may be thus selectively connected to an intergroup observation chamber 14. Insects, or other materials may of course be introduced into the observation space 98 of the chamber 14 by removing the inner cylinder 60, introducing the insects or materials and then replacing the cylinder 60. It is also to be noted that by lifting one cover 20 of the cover assembly 100, either or both of the receiving and cultivating units 12 may be replaced and exchanged for other similarly constructed units.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. An insect activity observation center comprising at least first and second insect receiving and cultivation units, each of said receiving and cultivation units being opened at one end and provided with transparent portions, a cover for each opened end, each cover being provided with means to permit introduction of insects and other materials into each respective unit, a nest disposed in each of said units to allow for normal activity of the insects, a base for supporting said units of said insect observation center, enlarged intergroup activity observation chamber means being provided with transparent portions and disposed between said first and second receiving and cultivation units, said intergroup activity observation chamber means being provided with first and second apertures, said first aperture communicating with an associated first connecting passageway member leading to said first receiving and cultivating unit, said second aperture communicating with an associated second connecting passageway member leading to said second receiving and cultivating unit, said intergroup activity observation chamber means being provided with unitary means movable between at least first and second positions for permitting and negating passage of insects between said receiving and cultivating units and said intergroup activity observation chamber means, said first position closing at least one of said first and second apertures for negating passage of insects from at least one respective receiving and cultivating unit to said intergroup activity observation chamber means, said second position opening both said first and second apertures for permitting passage of insects between both said first and second receiving and cultivating units and said intergroup activity observation chamber means.

2. An insect activity observation center according to claim 1, wherein said center is constructed of a transparent material.

3. An insect activity observation center according to claim 2, wherein said transparent material is colored red.

4. An insect activity observation center according to claim 1, wherein said receiving and cultivation units are each provided with a plurality of magnifying structures.

5. An insect activity observation center according to claim 1, wherein said observation chamber means is provided with a magnifying structure.

6. An insect activity observation center according to claim 1, wherein each of said receiving and cultivating units is interchangeable with each other and exchangeable for others of similar construction.

7. An insect activity observation center according to claim 1, wherein each nest is a miniature site of a human habitat.

8. An insect activity observation center according to claim 7, wherein each nest is provided with a background similar to a stage setting.

9. An insect activity observation center according to claim 1, wherein portions of each nest are disposed flush against inner walls of the associated receiving and cultivating unit.

10. An insect activity observation center according to claim 1, wherein said unitary means is movable between said first position, said second position and a third position, said first position closing said first aperture for negating passage of insects from said first receiving and cultivating unit to said intergroup activity observation chamber means, and said third position closing said second aperture for negating passage of insects from said second receiving and cultivating unit to said intergroup activity observation chamber means.

11. An insect activity observation center comprising at least two insect receiving and cultivation units, an intergroup activity observation chamber member disposed between said receiving and cultivation units, means for permitting and negating passage of insects between at least one of said receiving and cultivating units and said intergroup activity observation chamber member, each of said receiving and cultivation units being opened at one end, a cover for each opened end, each cover being provided with means to permit introduction of insects and other materials into each respective unit, a nest disposed in each of said units to allow for normal activity of the insects, a base for supporting said units of said insect observation center, said intergroup activity observation chamber member including a hollow outer cylinder provided with an end wall and a cylindrical sidewall, said means for permitting and negating passage including a removably telescopable and rotatable hollow inner cylinder disposed in said outer cylinder, said inner cylinder being provided with an end wall and a cylindrical sidewall, said sidewall of said outer cylinder being provided with a pair of diametrically oppositely located openings, each of said openings communicating with an associated connecting passageway member leading to a respective one of the said receiving and cultivating units, and said cylindrical sidewall of said inner cylinder being provided with three slots, two of said slots being located diametrically opposite each other and the third slot being disposed midway between said dismetrically opposed slots, said slots coacting with said openings to permit and negate passage of the insects.

12. An insect activity observation center according to claim 11, wherein each of said receiving and cultivating units is provided with a cover, each cover being provided with magnifying structures, each cover also being provided with an exit passageway, each of said exit passageways being in communicating relation with one of said openings in said outer cylinder of said group activity observation chamber member, said covers and said passageway members and said outer cylinder being constructed as one unit.

13. An insect activity observation center according to claim 11, wherein said end wall of said inner cylinder is provided with a magnifying structure.

14. An insect activity observation center according to claim 11, wherein each of said receiving and cultivating units is interchangeable with each other and exchangeable for others of similar constructions.

* * * * *